(12) United States Patent
Yang

(10) Patent No.: US 11,359,434 B2
(45) Date of Patent: Jun. 14, 2022

(54) OPTICALLY-SWITCHABLE THERMALLY-INSULATING VO$_2$-AEROGEL HYBRID FILM FOR WINDOW RETROFITS

(71) Applicant: Ronggui Yang, Boulder, CO (US)

(72) Inventor: Ronggui Yang, Boulder, CO (US)

( * ) Notice: Subject to any disclaimer, the term of this patent is extended or adjusted under 35 U.S.C. 154(b) by 0 days.

(21) Appl. No.: 17/028,301

(22) Filed: Sep. 22, 2020

(65) Prior Publication Data

US 2022/0090443 A1 Mar. 24, 2022

(51) Int. Cl.
*E06B 9/24* (2006.01)
*B32B 17/06* (2006.01)
*B32B 5/18* (2006.01)

(52) U.S. Cl.
CPC .................. *E06B 9/24* (2013.01); *B32B 5/18* (2013.01); *B32B 17/06* (2013.01); *B32B 17/066* (2013.01); *B32B 2264/102* (2013.01); *B32B 2264/301* (2020.08); *B32B 2266/02* (2013.01); *B32B 2266/057* (2016.11); *B32B 2266/126* (2016.11); *B32B 2307/40* (2013.01); *B32B 2307/402* (2013.01); *B32B 2419/00* (2013.01); *E06B 2009/2417* (2013.01)

(58) Field of Classification Search
None
See application file for complete search history.

(56) References Cited

U.S. PATENT DOCUMENTS

2017/0369330 A1* 12/2017 Schultz .................. D06M 23/08
2019/0333490 A1* 10/2019 Wang .................. C01B 33/1585

* cited by examiner

*Primary Examiner* — Chinessa T. Golden
(74) *Attorney, Agent, or Firm* — Greenberg Traurig, LLP; Peigen Jiang

(57) ABSTRACT

A retrofitted window is disclosed which includes a substantially transparent aerogel film laminated on a glass windowpane, the aerogel film being embedded with randomly dispersed nanoparticles of vanadium dioxide (VO$_2$) core and silicon dioxide (SiO$_2$) shell, wherein the vanadium dioxide (VO$_2$) core transitions between an insulator phase and a metal phase at a predetermined phase-transition temperature, and a volume fraction of the nanoparticles in the aerogel film is approximately between 0.001% and 0.05%.

13 Claims, 7 Drawing Sheets

OPTICALLY-SWITCHABLE THERMALLY-INSULATING VO$_2$-AEROGEL HYBRID FILM FOR WINDOW RETROFITS

BACKGROUND

The present invention relates generally to window insulations, and, more particularly, to an optically-switchable thermally-insulating VO$_2$-aerogel hybrid film for window retrofits.

Due to the relatively high thermal conductivity (about 1.0 W/(mK)), in comparison with 0.04~0.1 W/(mK) of building insulation materials, such as mineral wool, extruded polystyrene and cork, and the high infrared emissivity (about 0.84) of float glass, 40%~60% of the energy loss in buildings is through windows (Jelle, B. P., Hynd, A., Gustaysen, A., Arasteh, D., Goudey, H., Hart, R. (2012). Fenestration of today and tomorrow: A state-of-the-art review and future research opportunities. Sol. Energy Mater. Sol. Cells. 96, 1-28). For single-pane windows, the energy loss rate is in the range of 60~250 W/m$^2$ according to the American Society of Heating, Refrigerating and Air-Conditioning Engineers (ASHRAE) standard (ANSI/ASHRAE Standard 55-2010, Thermal Environmental Conditions for Human Occupancy). During the daytime, glass windows transmit as high as about 800 W/m$^2$ solar energy, which significantly reduces the heating demands in cold climates. However, the extra solar irradiance shedding in a room also increases the cooling demands and causes glare in hot climates. Moreover, the low thermal resistance of the single-pane window causes thermal discomfort and moisture condensation in cold climates.

As such, it is desirable to develop a window retrofit material that can dynamically manipulate the solar transmission and is thermally insulative.

SUMMARY

A retrofitted window is disclosed which includes a substantially transparent aerogel film laminated on a glass windowpane, the aerogel film being embedded with randomly dispersed nanoparticles of vanadium dioxide (VO$_2$) core and silicon dioxide (SiO$_2$) shell, wherein the vanadium dioxide (VO$_2$) core transitions between an insulator phase and a metal phase at a predetermined phase-transition temperature, and a volume fraction of the nanoparticles in the aerogel film is approximately between 0.001% and 0.05%.

By embedding insulator-metal phase transition vanadium dioxide (VO$_2$) nanoparticles inside an ultralow thermal conductivity aerogel film, the thermal insulation performance is greatly improved in such thermochromatic film while the solar transmission can be dynamically switched in response to ambient conditions. It was shown that a 3.0 mm thick film could achieve a low U-value of about 3.0 W/(m$^2$K), and a high luminous transmittance of larger than 60% and a solar modulation ability of about 20%. This film improves the performance of single-pane windows by improving thermal comfort and avoiding moisture condensation in cold climates and overheating in hot climates.

Figure 1:
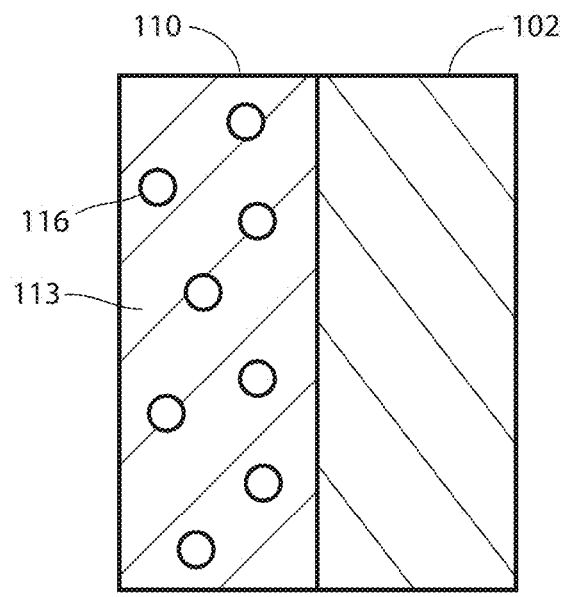
FIG. 1 is a cross-sectional view of a conventional windowpane covered by an energy efficient VAH film in accordance with an embodiment of the present disclosure.

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DESCRIPTION

The present invention relates to a thermochromatic VO$_2$-aerogel hybrid (VAH) film for retrofitting windowpanes. A preferred embodiment of the present invention will be described hereinafter with reference to the attached drawings.

FIG. 1 is a cross-sectional view of a conventional windowpane 102 covered by an energy efficient VAH film 110 in accordance with an embodiment of the present disclosure. The VAH film 110 is exemplarily made of an aerogel 113 embedded with randomly dispersed nanoparticles 116. In embodiments, the aerogel 113 is a transparent matrix with ultralow thermal conductivity (proximately 0.018 W/(mK)) to increase the conductive thermal resistance of the windowpane and to reduce energy loss. The aerogel 113 can exemplarily be silica aerogel or other synthesized mechanically enhanced aerogels such as liquid-crystalline nanocellulose aerogel, and organic-inorganic crosslinked hybrid aerogels, as long as the nanoparticles 116 can be embedded.

Referring again to FIG. 1, the nanoparticles 116 are exemplarily made of chromogenic materials as they can dynamically modulate solar transmission when the environment changes. In embodiments, the chromogenic material is vanadium dioxide (VO$_2$) which can regulate solar transmission in the near-infrared range (780-2500 nm wavelength) through a reversible insulator-metal structural transformation at 68° C. By doping with other elements such as magnesium or tungsten, the phase transition temperature of doped VO$_2$ can be tailored down to room temperature round 20-22° C. Embedding dilute VO$_2$ nanoparticles in dielectric hosts such as the aerogel 113 can considerably improve the luminous transmittance to above 50% and the solar modulation ability to around 20%.

Figure 2:
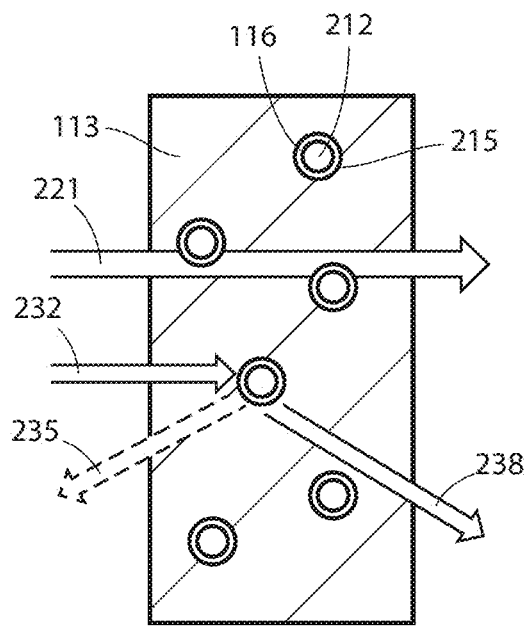
FIG. 2 is a cross-sectional view of the VAH film of FIG. 1 with imbedded nanoparticles.

FIG. 2 is a cross-sectional view of the VAH film 110 of FIG. 1 with imbedded nanoparticles 116. In embodiments, the nanoparticles 116 has a $VO_2$ core 212 and a $SiO_2$ coating 215. The $SiO_2$ coating 215 increases the environmental durability of the $VO_2$ nanoparticles 116 by preventing the transformation of $VO_2$ to $V_2O_5$ due to natural oxidation. As shown in FIG. 1, visible light 221 can always go through the VAH film 110 without being interfered by the nanoparticles 116. However, near-infrared light 232 of a solar irradiance may be blocked by the $VO_2$ nanoparticles 116 depending on the phase thereof. When the temperature T of the $VO_2$ nanoparticles 116 is lower than the critical phase transition temperature $T_c$. ($T<T_c$), $VO_2$ nanoparticles 116 are in the electrically-insulating state, and the VAH film 110 is transparent to solar radiation. As shown in FIG. 2, even the near-infrared light 238 can transmit through the VAH film, hence warming up the windowpane 102. When $T>T_c$, $VO_2$ nanoparticles 116 transform to the metallic phase, while the visible light 221 can still transmit through the VAH film 110, the near-infrared part 235 of the solar irradiance is blocked. The temperature of the $VO_2$ nanoparticles (T) inside the VAH film 110 is regulated by the environmental temperatures at both sides of the windowpane 102 along with solar radiation that shines on the VAH film 110. According to the ASHRAE standard, an external environmental temperature is 32° C. in summer. Given that the temperature of $VO_2$ nanoparticles 116 inside the film 110 is much higher than that of the external ambient due to solar absorption, the phase transition temperature $T_c$ is exemplarily set as approximately 40° C. in embodiments, which is achieved by doping the $VO_2$ nanoparticles 116 with a predetermined dose of other elements such as magnesium and/or tungsten. It is noted that, if the phase transition temperature was chosen to be lower, e.g., at room temperature, the insulating $VO_2$ may transition to the metallic $VO_2$ state during heating seasons, resulting in the reduction of the useful solar irradiance and increase of heating loads.

The optical performance of the thermochromatic VAH film 110 is characterized by the luminous transmittance and solar modulation ability. The mean luminous (380-780 nm) transmittance $\tau_{lum}$ is defined as (Cui, Y., Ke, Y., Liu, C., Chen, Z., Wang, N., Zhang, L., Zhou, Y., Wang, S., Gao, Y., Long, Y. (2018). Thermochromic $VO_2$ for energy-efficient smart windows. Joule; and 35. Li, X. H., Liu, C., Feng, S. P., Fang, N. X. (2018). Broadband Light Management with Thermochromic Hydrogel Microparticles for Smart Windows. Joule)

$$\tau_{lum} = \frac{\int_{380\ nm}^{780\ nm} I_{lum,\lambda}\tau_\lambda d\lambda}{\int_{380\ nm}^{780\ nm} I_{lum,\lambda} d\lambda} \quad \text{(Equation 1a)}$$

where $I_\lambda$ is the solar radiation intensity, and $\tau_\lambda$ is the transmittance of radiation at wavelength $\lambda$. The solar modulation ability $\Delta\tau_{sol}$ is defined by the difference of solar transmittance (280-2500 nm) before and after the phase transition, $$\Delta\tau_{sol} = \tau_{sol}(T<T_c) - \tau_{sol}(T>T_c) \quad \text{(Equation 1b)}$$

where $\tau_{sol}$ is the mean solar (280-2500 nm) transmittance, which is defined by $$\tau_{sol} = \frac{\int_{280\ nm}^{2500\ nm} I_{sol,\lambda}\tau_\lambda d\lambda}{\int_{280\ nm}^{2500\ nm} I_{sol,\lambda} d\lambda} \quad \text{(Equation 1a)}$$

In Equations 1(a-c), the luminous transmittance $\tau_{lum}$ and solar modulation ability $\Delta\tau_{sol}$ of the thermochromatic VAH film 110 are determined by the size and volume fraction of the core-shell $VO_2/SiO_2$ nanoparticles, and the thickness of the aerogel film 113.

According Li, et al. (Li, S. Y., Niklasson, G. A., Granqvist, C. G. (2010). Nanothermochromics: calculations for $VO_2$ nanoparticles in dielectric hosts show much improved luminous transmittance and solar energy transmittance modulation. J. Appl. Phys. 108 (6), 063525), a 5.0 μm thick film with approximately 1% volume fraction of $VO_2$ nanoparticles has luminous transmission $\tau_{lum}$ of approximately 0.7. To achieve similar optical performances ($\tau_{lum}$=0.6~0.7), the volume fraction of the $VO_2/SiO_2$ nanoparticles needs to remain very low (<<1%) as the hybrid film thickness is expected to be around several millimeters to be an effective thermal barrier. The low volumetric fraction guarantees that each $VO_2/SiO_2$ nanoparticle 116 inside the VAH film 110 can be considered as an individual scattering center. According to the Lorenz-Mie theory, when a single core-shell particle with inner diameter a and outer diameter b interacts with an electromagnetic wave with wavelength $\lambda$, the thermal radiative properties of the core-shell particle are governed by the complex refractive index of the core (shell) material $m_1$ ($m_2$), and the size parameters $x=\pi a/\lambda$ and $y=\pi b/\lambda$. The scattering ($Q_{sca}$) extinction ($Q_{ext}$) and absorption ($Q_{abs}$) efficiency factors of a single core-shell nanoparticle are evaluated by $$Q_{sca,\lambda} = \frac{2}{x^2}\sum_{n=1}^{\infty}(2n+1)(|a_n|^2+|b_n|^2) \quad \text{(Equation 2a)}$$

$$Q_{ext,\lambda} = \frac{2}{x^2}\sum_{n=1}^{\infty}(2n+1)\ Re(a_n+b_n) \quad \text{(Equation 2b)}$$

$$Q_{abs,\lambda} = Q_{ext,\lambda} - Q_{sca,\lambda} \quad \text{(Equation 2c)}$$

where $a_n$ and $b_n$ are the Mie scattering coefficients and functions of x, y, $m_1$, and $m_2$, and Re (•) denotes the real part of a complex number. The details of $a_n$ and $b_n$ can be found in Bohren, C. F., Huffman, D. R. (2008). Absorption and scattering of light by small particles. John Wiley & Sons.

Since the $VO_2/SiO_2$ core/shell nanoparticles 116 are randomly dispersed inside the VAH film 110, assuming the total number of nanoparticles 116 per volume is N, then the spectrum extinction coefficient $\beta_{p,\lambda}$(m−1) can be expressed as the summation of the scattering cross-section of all the particles (Zhu, C. Y., Li, Z. Y., Pang, H. Q., Pan, N. (2018). Design and optimization of core/shell structures as highly efficient opacifiers for silica aerogels as high-temperature thermal insulation. Int. J. Therm. Sci. 133, 206-215), $$\beta_{p,\lambda} = N\frac{1}{4}\pi b^2 Q_{ext} = \frac{3}{2}\frac{V_f Q_{ext}}{b} \quad \text{(Equation 3)}$$

where $V_f$ is the volume fraction of the core-shell nanoparticles 116. Because the volume fraction of the nanoparticles is very low, and the aerogel matrix is dielectric, the interaction between the embedded nanoparticles and the aerogel matrix is ignored. Thus, the spectral extinction coefficient $\beta_\lambda$ of the VAH film is evaluated by (Wang, X. D., Sun, D., Duan, Y. Y., Hu, Z. J. (2013). Radiative characteristics of opacifier-loaded silica aerogel composites. J. Non-Cryst. Solids. 375, 31-39)

$$\beta_\lambda = \beta_{p,\lambda} + \beta_{a,\lambda} \quad \text{(Equation 4)}$$

where $\beta_{a,\lambda}$ is the spectrum extinction coefficient of the aerogel matrix. The spectral transmittance $\tau_\lambda$ of the VAH film 110 with a thickness $L_{vah}$ is given by the Beer-Lambert law (Modest, M. F. (2013). Radiative heat transfer. Academic Press), $$\tau_\lambda = e^{-\beta_\lambda L_{vah}} \quad \text{(Equation 5)}$$

With the spectral transmittance calculated using Equation (5), the luminous transmittance (Equation 1(a)) and the solar modulation ability (Equation 1(b)) of the VAH films 110 can then be calculated.

Since the thermochromatic VAH film 110 can greatly reduce the temperature difference between the inside surface of window pane and the room environment, the thermal comfort and condensation resistance of single-pane windows may be improved remarkably. In general, the thermal comfort concerns the satisfaction of occupants with the thermal environment (Taleghani, M., Tenpierik, M., Kurvers, S. (2013). Van Den Dobbelsteen, A., A review into thermal comfort in buildings. Renew. Sust. Energ. Rev., 26, 201-215). As the temperature difference between the occupants and the innermost surface of windows leads to "radiant temperature asymmetry" (Lyons, P., Arasteh, D., Huizenga, C. (2000). Window performance for human thermal comfort. ASHRAE Trans. 106 (1), 594-604), a human body would lose thermal energy through infrared thermal radiation, which in turn affects the thermal comfort in the buildings. Moisture condensation would occur when the surface temperature of the window panes reaches the dew point of the interior environment. Moisture condensation not only reduces the clear view of windows, but also limits the humidity level inside the building, which is a big concern for indoor air quality.

To evaluate the thermal comfort, condensation resistance and energy loss of single-pane windows employing a thermochromatic VAH film 110, the heat transfer across both the VAH film 110 and the windowpane 102 needs to be calculated. As shown in FIG. 1, the temperature distribution across the window (VAH film 110 and windowpane 102) is affected by many factors such as room/ambient temperature, external wind speed, internal natural convection, surface emissivity and absorption of solar radiation by the window materials. Assuming the length and width of a window pane are much larger than its thickness and the contact resistance between the VAH film and glass can be ignored, one-dimensional (1D) heat transfer equations across the VAH film and the glass pane are written as (McEnaney, K., Weinstein, L., Kraemer, D., Ghasemi, H., Chen, G. (2017). Aerogel-based solar thermal receivers. Nano Energy. 40, 180-186)

$$k_{vah}\frac{\partial^2 T(z)}{\partial z^2} + \nabla q(z) = 0, \; z \leq L_{vah} \quad \text{(Equation 6a)}$$

$$k_{gla}\frac{\partial^2 T(z)}{\partial z^2} + \nabla q(z) = 0, \; L_{vah} < z \leq L_{vah} + L_{gla} \quad \text{(Equation 6b)}$$

where, $k_{vah}$ and $k_{gla}$ are the thermal conductivities of the thermochromatic VAH film 110 and the glass windowpane 102, respectively. $L_{vah}$ and $L_{gla}$ are the thicknesses of the VAH film 110 and glass windowpane 102, and T (z) and q(z) represent the distributions of temperature and heat flux along the z-direction. Here, the local heat flux distribution q(z) is determined by the absorption of solar irradiance across the VAH film and the glass. The boundary conditions of Equation (6) can be written as $$q_o|_{z=0} = h_o(T_a - T_{z=0}) + \sigma\varepsilon_o(T_a^4 - T_{z=0}^4) \quad \text{(Equation 7a)}$$

$$-k_{vah}\frac{dT(z=L_{vah}^-)}{dz} = -k_{gla}\frac{dT(z=L_{vah}^+)}{dz} \quad \text{(Equation 7b)}$$

$$q_i|_{z=L_{vah}+L_{gla}} = h_i(T_{z=L_{vah}+L_{gla}} - T_r) + \sigma\varepsilon_i(T_{z=L_{vah}+L_{gla}}^4 - T_r^4) \quad \text{(Equation 7c)}$$

where $T_a$ and $T_r$ are the external ambient temperature and internal room temperature, respectively. $h_e$, $\varepsilon_e$ and $h_i$, $\varepsilon_i$ are the convective heat transfer coefficients and average surface emissivities of external and internal sides, and $\sigma$ is the Stefan-Boltzmann's constant.

To determine the local heat flux distribution q(z) in Equations 6 (a-b), the radiative transfer equation (RTE) of solar radiation needs to be solved. By assuming that radiation scattering is isotropic, the one-dimensional RTE in the z-direction across the window can be written as $$\frac{\mu}{\beta_\lambda}\frac{dI_\lambda}{dz} = -I_\lambda + (1-\omega_\lambda)I_{b\lambda} + \frac{\omega_\lambda}{2}\int_{-1}^{1} I_\lambda(\mu')d\mu' \quad \text{(Equation 8)}$$

where $\mu = \cos\theta$ is the directional cosine and $\theta$ is the polarization angle away from z, $I_\lambda$ is the radiation intensity, $I_{b\lambda}$ is the intensity of the black body radiation at position z, and $\omega_\lambda \approx Q_{sca,\lambda}/Q_{ext,\lambda}$ is the scattering albedo. In Equation (8), the local blackbody emission $I_{b\lambda}$ within the range of 280-2500 nm (solar band) can be ignored due to the low temperature inside the VAH film and the glass, according to Planck's law (Modest, M. F. (2013). Radiative heat transfer. Academic Press). Assuming that the radiative density is isotropic, while different in the forward and backward directions (FIG. 2), Schuster-Schwarzschild approximation, also called the two-flux method, can be used to solve the Equation (8). Thus, $$I_\lambda(u,z) = \begin{cases} I_\lambda^-(z), -1 < \mu < 0 \\ I_\lambda^+(z), 0 < \mu < +1 \end{cases} \quad \text{(Equation 9)}$$

By integrating Equation (8) over the upper and lower hemispheres, respectively, resulting in, $$\frac{1}{2\beta_\lambda}\frac{dI_\lambda^+(z)}{dz} = -I_\lambda^+(z) + \frac{\omega_\lambda}{2}(I_\lambda^+(z) + I_\lambda^-(z)) \quad \text{(Equation 10a)}$$

$$-\frac{1}{2\beta_\lambda}\frac{dI_\lambda^-(z)}{dz} = -I_\lambda^-(z) + \frac{\omega_\lambda}{2}(I_\lambda^2(z) + I_\lambda^-(z)) \quad \text{(Equation 10b)}$$

Once $I_\lambda^+(z)$ and $I_\lambda^-(z)$ are determined, the local heat flux in Equation (6) can be calculated by (McEnaney, K., Weinstein, L., Kraemer, D., Ghasemi, H., Chen, G. (2017). Aerogel-based solar thermal receivers. Nano Energy. 40, 180-186)

$$q(z) = \pi\int_0^\infty (I_\lambda^+(z) - I_\lambda^-(z))d\lambda \quad \text{(Equation 11)}$$

The boundary conditions of Equations 10 (a-b) are shown in FIG. 2. At the air-VAH interface (z=0), the radiation $I_\lambda^+(z=0^+)$ in the VAH film side is the sum of the reflected radiation incident on VAH and the transmitted solar radiation, $$I_\lambda^+(z=0^+)=R_{a\text{-}vah,\lambda}I_\lambda^-(z=0^+)+T_{a\text{-}vah,\lambda}I_{solar,\lambda} \quad \text{(Equation 12a)}$$

where $I_{solar,\lambda}$ is the intensity of solar radiation, $R_{vah\text{-}a,\lambda}$ is the spectral reflectance from the VAH film side to air side, and $T_{a\text{-}vah,\lambda}$ is the transmittance from air side to the VAH film side. For the VAH-glass interface at $z=L_{vah}$ (FIG. 2), where $L_{vah}$ is the VAH film thickness, the radiation going inside the window glass is the sum of the radiation transmitted through the interface and reflected off radiation by the interface, $$I_\lambda^+(z=L_{vah}^+)=R_{g\text{-}vah,\lambda}I_\lambda^-(z=L_{vah}^+)+T_{vah\text{-}g,\lambda}(z==L_{vah}^-)\text{(Equation 12b)}$$

where $R_{g\text{-}vah,\lambda}$ is the spectral reflectance from the glass to the VAH film, and $T_{vah\text{-}g,\lambda}$ is the transmittance from the VAH film 110 to the windowpane glass 102 under a specific incident angle. At the glass-air interface ($z=L_{vah}+L_{gla}$), the backward radiation equals the reflected radiation at the glass-air interface, $$I_\lambda^-(z=(L_{vah}+L_{gla}))=R_{g\text{-}a,\lambda}I_\lambda^+(z=(L_{vah}+L_{gla})^-) \quad \text{(Equation 12c)}$$

where $R_{g\text{-}a,\lambda}$ is the spectral reflectance from glass to air. The interface reflectances and transmittances in Equations 12 (a-c) are calculated using Snell's law, and the Fresnel equations (Born, M., Wolf, E. (2013). Principles of optics: electromagnetic theory of propagation, interference and diffraction of light. Elsevier).

Equations (6-12) together show that the heat conduction and thermal radiation are coupled, which are needed to be solved numerically. Because the boundary conditions shown in Equations 7(a-c) are determined by the temperature distribution in the window pane, an initial temperature distribution is given first. The simplified RTE (Equations 10 (a-b)) and heat transfer equation (Equations 6(a-b)) are then discretized and solved iteratively using the finite volume method (FVM) to obtain the new temperature field and heat flux distribution (Eymard, R., Gallouet, T., Herbin, R. (2000). Finite volume methods. Handbook of Numerical Analysis, 7, 713-1018). The new temperature field is then used to update the thermal boundary conditions (Equations 7(a-c)). The iteration continues until the converged criterion $(\max|T_{N+1}(z)-T_N(z)|<10^{-5}$ K) is satisfied, where N is the number of iterations. For clear and uncoated float glass, the thermal conductivity and average surface emissivity are assumed to be $k_g=0.96$ W/(mK) and $\varepsilon_f\approx0.84$, respectively (Jelle, B. P. (2013). Solar radiation glazing factors for window panes, glass structures and electrochromic windows in buildings-Measurement and calculation. Sol. Energy Mater. Sol. Cells. 116, 291-323; and Zhao, X., Mofid, S. A., Al Hulayel, M. R., Saxe, G. W., Jelle, B. P., Yang, R. (2019). Reduced-scale hot box method for thermal characterization of window insulation materials. Appl. Therm. Eng. 160, 114026). According to the effective medium theory, the influence of core-shell $VO_2/SiO_2$ nanoparticles 116 on the thermal resistance of the VAH film 110 is negligible when their concentrations are very low (<0.1%). The thermal conductivity and average surface emissivity of the transparent aerogel film are assumed to be $k_g=0.018$ W/(mK) and $\varepsilon_0\approx0.84$, respectively (Liu, Q., Frazier, A. W., Zhao, X., Joshua, A., Hess, A. J., Yang, R., Smalyukh, I. I. (2018). Flexible transparent aerogels as window retrofitting films and optical elements with tunable birefringence. Nano Energy. 48, 266-274). The internal heat transfer coefficient is assumed to be $h_i=3.6$ W/(m$^2$K) and external convective heat transfer coefficient can be evaluated by and $h_O=(10+4.1v)$ W/(m$^2$K), where v (m/s) is the wind speed (Jelle, B. P. (2013). Solar radiation glazing factors for window panes, glass structures and electrochromic windows in buildings-Measurement and calculation. Sol. Energy Mater. Sol. Cells. 116, 291-323).

The thickness of the aerogel matrix influences both the thermal insulation performance and the solar transmission of the $VO_2$-aerogel hybrid (VAH) film (Equations 1 (a) and 1 (c)). Here, the thermal performance of the VAH film is approximately evaluated by the overall heat transfer coefficient, namely U-value, which is defined as $$\frac{1}{U}=\frac{1}{h_{e,all}}+\frac{1}{k_{vah}/L_{vah}+k_{gla}/L_{gla}}+\frac{1}{h_{i,all}} \quad \text{(Equation 13)}$$

where $k_{vah}$ and $L_{vah}$ are the thermal conductivity and thickness of VAH film, $k_{gla}$ and $L_{gla}$ are the thermal conductivity and thickness of glass, $h_{i,all}$ and $h_{e,all}$ are the internal and external overall heat transfer coefficients in which both the convective and radiative heat transfer are included. Note that Equation (13) doesn't consider the solar absorption, and the radiative heat transfer between the VAH films and the environments was evaluated by Stefan-Boltzmann law. From Equation (13), it is clear that increasing the thickness of the aerogel matrix ($L_{vah}$) can improve the thermal insulation performance of the VAH film.

Figure 3A:
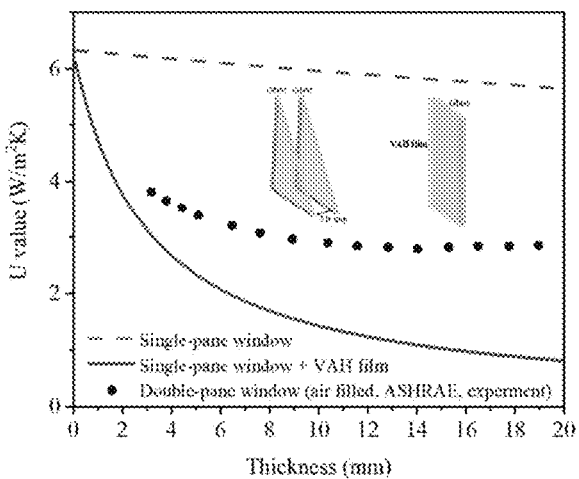
FIGS. 3A-3C illustrate how the thickness of the aerogel matrix influences both the thermal insulation performance and the solar transmission of the VO$_2$-aerogel hybrid (VAH) film.
Figure 3B:
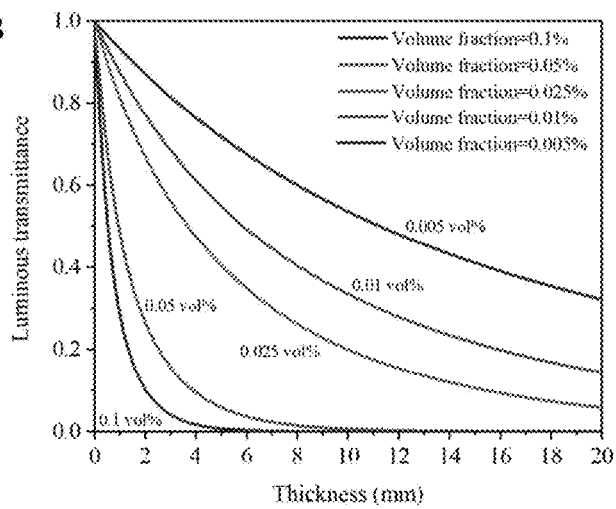
Figure 3C:
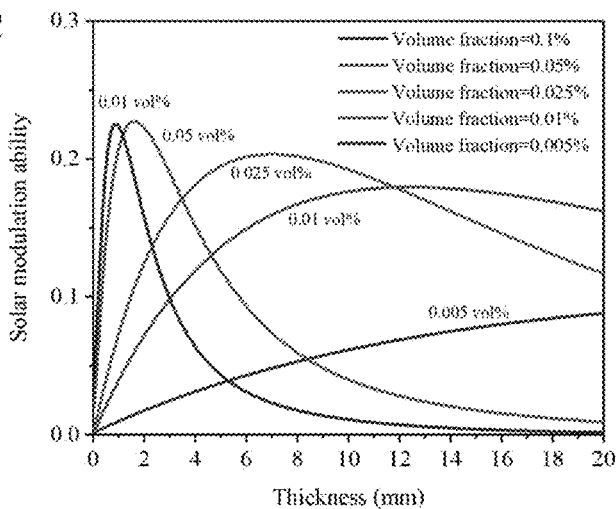

FIGS. 3A-3C illustrate how the thickness of the aerogel matrix influences both the thermal insulation performance and the solar transmission of the $VO_2$-aerogel hybrid (VAH) film. FIG. 3A compares the U-values of a single-pane window (3.0 mm in thickness) covered by the thermochromatic VAH film 110, a single-pane window and an air-filled double-pane window (Yu, L., Zhang, X. (2004). Hydrothermal synthesis and characterization of vanadium oxide/titanate composite nanorods. Mater. Chem. Phys. 87 (1), 168-172) exposed to winter climates as a function of thickness, where the external temperature is $T_a=-18°$ C., the internal temperature is $T_r=21°$ C., and the wind speed is 5.5 m/s (ASHRAE standard). It is found that 3.0 mm thick aerogel could reduce the energy loss of a single-pane window by about 50%, which is close to the insulation performance of an air-filled double-pane window (FIG. 3A). However, it is also noted that the decrease of U-value is nonlinear, and the decreasing rate becomes slower as the thickness of the aerogel matrix increases. This is because the U-values are dominated by the convective heat transfer along the window surface (Equation (1)) when the conductive thermal resistance of the window pane increases.

FIGS. 3B and 3C show the results of the luminous transmittance and solar modulation ability as a function of the aerogel thickness and the volume fraction of $VO_2/SiO_2$ nanoparticles calculated based on Equations (1-5), where the inner and outer diameters are assumed to be a=50 nm, and b=80 nm, respectively. As shown in FIG. 3B, the luminous transmittance of the VAH film 110 decreases with the increase of aerogel thickness. The transparency of the VAH film 110 can be improved by decreasing the volume fraction of core-shell $VO_2/SiO_2$ nanoparticles, but the solar modulation ability also decreases (FIG. 3C).

FIGS. 3A-3C indicate that there is an optimal film thickness within the range of 3-5 mm. Note that the optimal thickness may change when a different size of core-shell $VO_2/SiO_2$ nanoparticles is used. In embodiments, the thermal insulation performance of single-pane windows with the VAH film 110 is expected to be close to the air-filled double-pane windows. Therefore, a 3.0 mm VAH thickness is used in our calculations in the following sections.

The optical performance of the thermochromatic VAH film 110 is closely related to the concentration, size, and distribution of the core-shell $VO_2/SiO_2$ nanoparticles. According to the recent progress (Nguyen, T. D., Do, T. O. (2009). Solvo-hydrothermal approach for the shape-selective synthesis of vanadium oxide nanocrystals and their characterization. Langmuir. 25 (9), 5322-5332; and Yu, L., Zhang, X. (2004). Hydrothermal synthesis and characterization of vanadium oxide/titanate composite nanorods. Mater. Chem. Phys. 87 (1), 168-172), the diameters of pure crystalline $VO_2$ nanoparticles fabricated under different synthesis routes vary between 5 and 50 nm. In order to enhance durability and prevent oxidation, the $VO_2$ nanoparticles may be coated with a thin layer of oxides such as $SiO_2$, ZnO, $TiO_2$, and $WO_3$ ranging from 10 to 50 nm, to form the core-shell structure nanoparticles. Therefore, in embodiment, the $VO_2$ nanoparticle with a diameter in the range of 10-50 nm, and the $SiO_2$ shell with a thickness of 10-50 nm are modeled for optimizing the luminous transmittance and solar modulation ability. The volume fraction of the $VO_2/SiO_2$ in the VAH film 110 varies from 0.001% to 0.05%. The refractive index of $SiO_2$ is set as 1.5. The solar spectrum of air mass 1.5 (AM1.5), which corresponds to the sun standing 37° above the horizon (Riordan, C., Hulstron, R. (1990). What is an air mass 1.5 spectrum? (Solar cell performance calculations), IEEE Conference on Photovoltaic Specialists, IEEE, pp 1085-1088), is used to calculate the mean luminous transmittance and solar modulation ability.

Figure 4A:
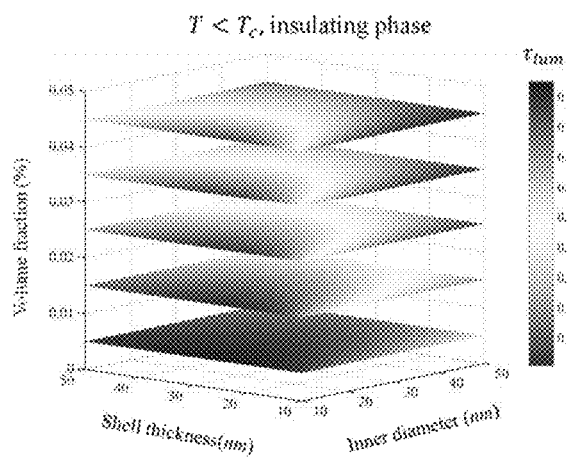
FIGS. 4A-4C illustrate the influence of the size and volume fraction of the core-shell VO$_2$/SiO$_2$ nanoparticles on the thermochromic performance with an aerogel film thickness of 3 mm.
Figure 4B:
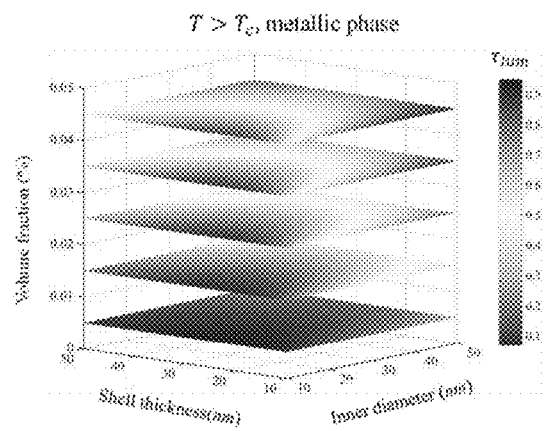
Figure 4C:
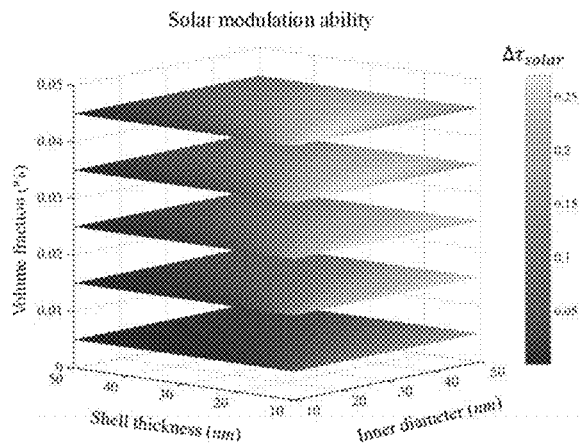

FIGS. 4A-4C illustrate the influence of the size and volume fraction of the core-shell $VO_2/SiO_2$ nanoparticles on the thermochromic performance with an aerogel film thickness of 3 mm. FIGS. 4A-4B show the results of the luminous transmittance of a 3.0 mm thick VAH film in both the insulating phase and the metallic phase as a function of inner diameter, shell thickness, and volume fraction of the $VO_2/SiO_2$ in the VAH film calculated based on Equations (1-5). It is found that, for the $VO_2$ nanoparticles in both the insulating phase and the metallic phase, the luminous transmittances $\tau_{lum}$ of the VAH film decreases while the solar modulation ability $\Delta\tau_{solar}$ becomes larger as the size of the $VO_2$ nanoparticle increases (FIG. 4C). This indicates that the luminous transmittance $\tau_{lum}$ needs to be sacrificed to achieve larger solar modulation ability $\Delta\tau_{solar}$. Here, the recommended $\tau_{lum}=0.7$ and $\tau_{lum}=0.6$ are used for winter and summer, respectively (Rezaei, S. D., Shannigrahi, S., Ramakrishna, S. (2017). A review of conventional, advanced, and smart glazing technologies and materials for improving indoor environment. Sol. Energy Mater. Sol. Cells. 159, 26-51). Then it is found that the highest $\Delta\tau_{solar}$ (20.2%) was reached when the diameter of $VO_2$ nanoparticle is 25 nm, outer diameter is 40 nm ($SiO_2$ shell thickness of 7.5 nm), and the volume fraction of $VO_2/SiO_2$ nanoparticles is 0.01%.

Figure 5:
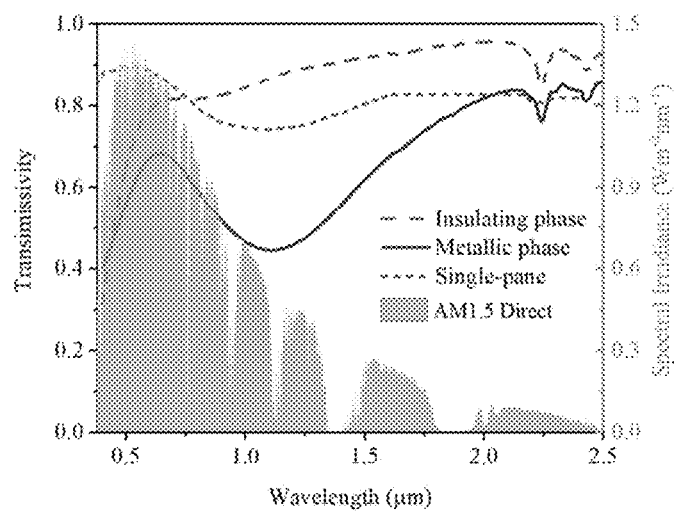
FIG. 5 shows the spectral transmittance of the VAH film in both hot and cold climates.

FIG. 5 shows the spectral transmittance of the VAH film 110 in both hot and cold climates. As expected, the NIR transmittance of the VAH films exhibits a strong dependence on the phase state of the $VO_2$ nanoparticles, while the luminous transmittance almost keeps constant.

Figure 6A:
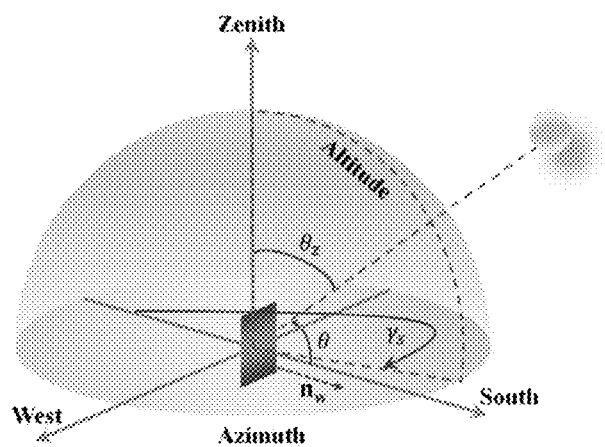
FIGS. 6A-6D illustrate thermal insulation performance of the VAH film.

FIGS. 6A-6D illustrate thermal insulation performance of the VAH film 110. FIG. 6A shows the relative position between the south-facing single-pane window and the sun, where $n_w$, pointing to the south, is the normal direction of the window, $\theta_z$ is the azimuth angle, $\theta$ is the solar incidence angle, and $\gamma_s$ is the solar azimuth angle. Here, the intensity of the solar irradiation reaching the external surface of the window pane (Equation 12(a)) is evaluated according to the solar incidence angle $\theta$ which is the angle between the incident beam radiation and the normal direction of the window pane. The solar azimuth angle $\gamma_s$ is the angular displacement measured eastward from north to the projection of beam radiation on the horizontal plane (Reda, I., Andreas, A. (2004). Solar position algorithm for solar radiation applications. Sol. Energy. 76 (5), 577-589).

Figure 6B:
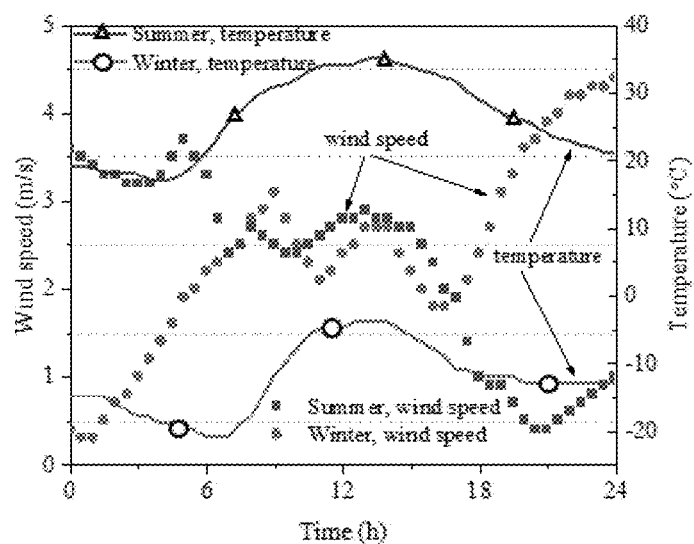
Figure 6C:
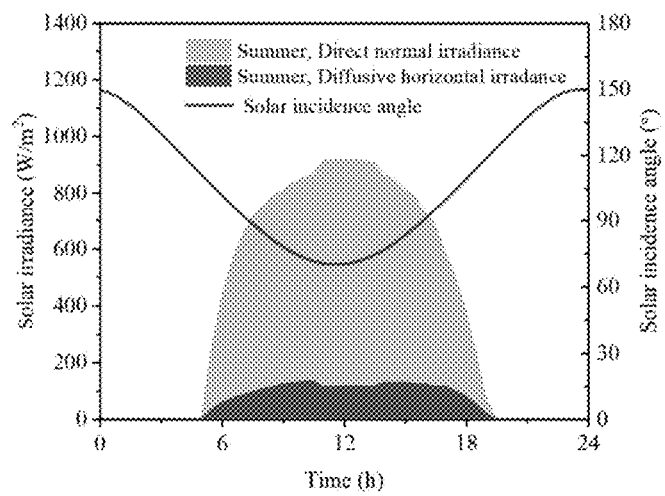
Figure 6D:
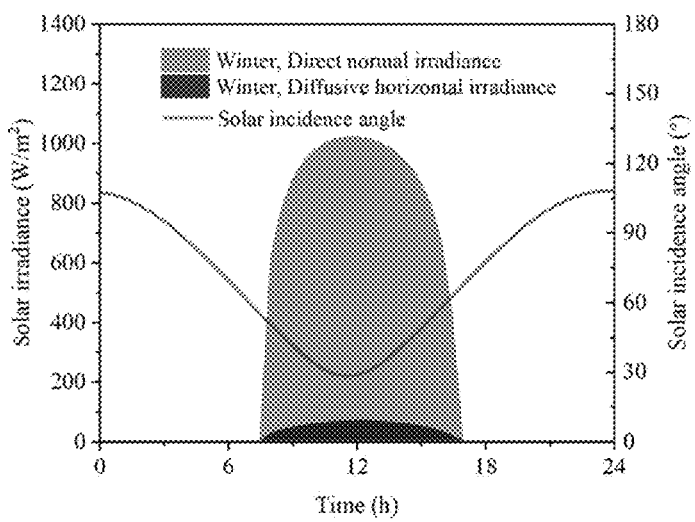

FIGS. 6B-6C show the outdoor temperatures and wind speeds and solar irradiances in one of the hottest days in summer (24 Jul. 2017) and one of the coldest days in winter (6 Jan. 2017) days in Boulder, Colo., USA. The solar incidence angle $\theta$ in FIGS. 6C-6D are calculated based on the solar position algorithm developed in Reda, I., Andreas, A. (2004). Solar position algorithm for solar radiation applications. Sol. Energy. 76 (5), 577-589.

Figure 7A:
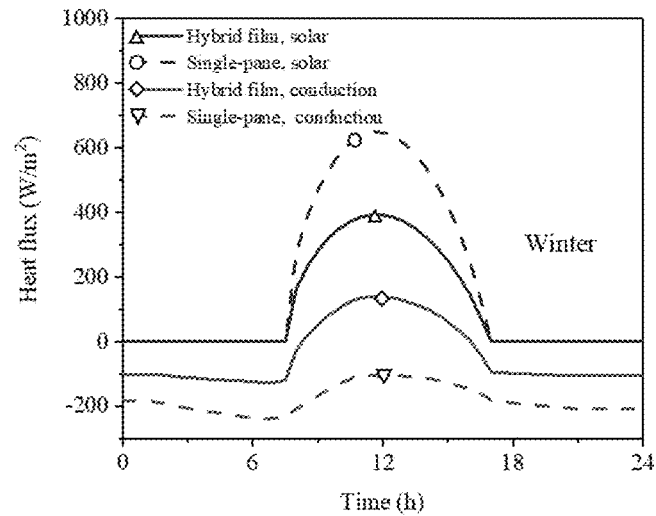
FIGS. 7A-7D compare the thermal insulation performances of a south-facing single-pane window and a south-facing single-pane window employing the VAH film under the weather conditions shown in FIGS. 6A-6D.
Figure 7B:
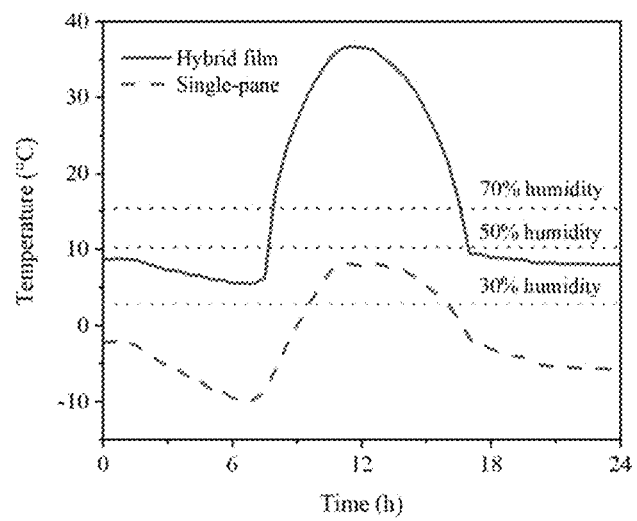

FIGS. 7A-7D compare the thermal insulation performances of a south-facing single-pane window and a south-facing single-pane window employing VAH film 110 under the weather conditions shown in FIGS. 6A-6D (Equations (6-12)). As shown in FIG. 7A, employing the VAH film 110 can reduce about 50% heat loss through a single-pane window caused by the temperature difference between external and internal environments at night time during winter. In addition, the inside surface temperature of window pane also rises considerably (FIG. 7B), which greatly reduces the heat loss through infrared thermal radiation (wavelength peaks at about 10 μm for room temperature) from the human body and improves the thermal comfort of the single-pane window. In FIG. 7B, it is also noted that employing the VAH film 110 may prevent moisture condensation even when the indoor relative humidity level reaches about 50%, which is much higher than that of the single-pane windows. As shown in FIG. 7A, during the daytime, the single-pane window allows more solar irradiance to transmit through, but thermal discomfort and moisture condensation remain issues due to the low surface temperature. However, when the VAH film 110 is adopted, the $VO_2/SiO_2$ nanoparticles in the VAH film 110 can absorb solar irradiance and convert into heat that can be transferred to the room environments through heat conduction. Thus, it is seen that the inside window surface temperature is much higher in FIG. 7B and there is heat flow from the window surfaces to the indoor environments in FIG. 7A.

Figure 7C:
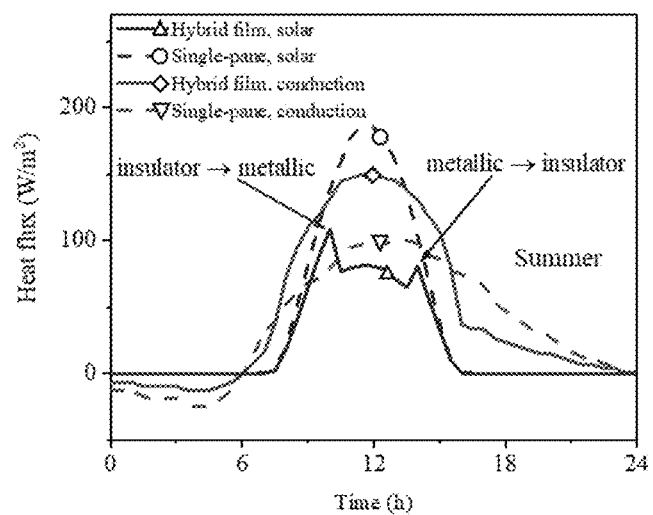

FIG. 7C shows the heat flow from the external environment to the room due to temperature difference and solar irradiation in the hot climates, where positive/negative signs show heat flow into/out of the room environment. It is seen that the $VO_2$ nanoparticles reach the phase change temperature (40° C.) at about 11:00 a.m. due to high external ambient temperatures and absorbed solar irradiance. Solar irradiances transmitting through the window drops, which reduces the sun's glare and cooling demands caused by the extra solar heating. As the direct solar irradiance decreases and the solar incidence angle increases, the $VO_2$ changes from the metallic phase to the insulating phase at about 2:00 μm.

Figure 7D:
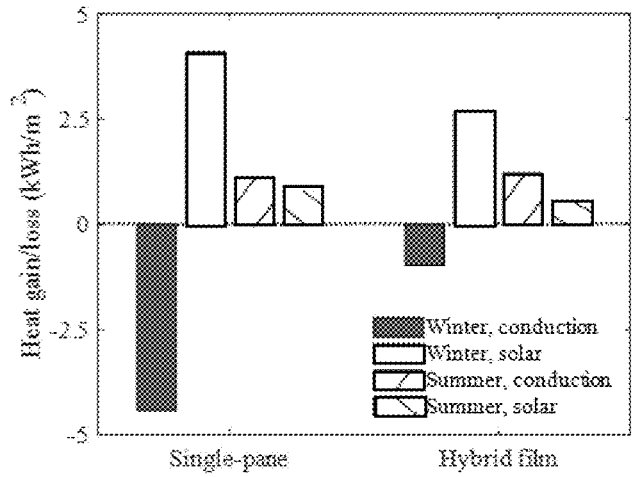

FIG. 7D shows the average heat loss/gain of a south-facing window on a winter day and a summer day, in which the positive/negative sign represents the heat gain/loss. When heat loss/gain in both winter and summer days are considered together, the heating/cooling demands of a south-facing single-pane window stands at about 2.32 kWh/m², while the heating/cooling demands go down to about 0.06 kWh/m² when the VAH film 110 is adopted. The above results show that employing the VAH film 110 can not only significantly reduce the heating and cooling loads of single-pane windows but also improve the thermal comfort and indoor humidity level.

Figure 8:
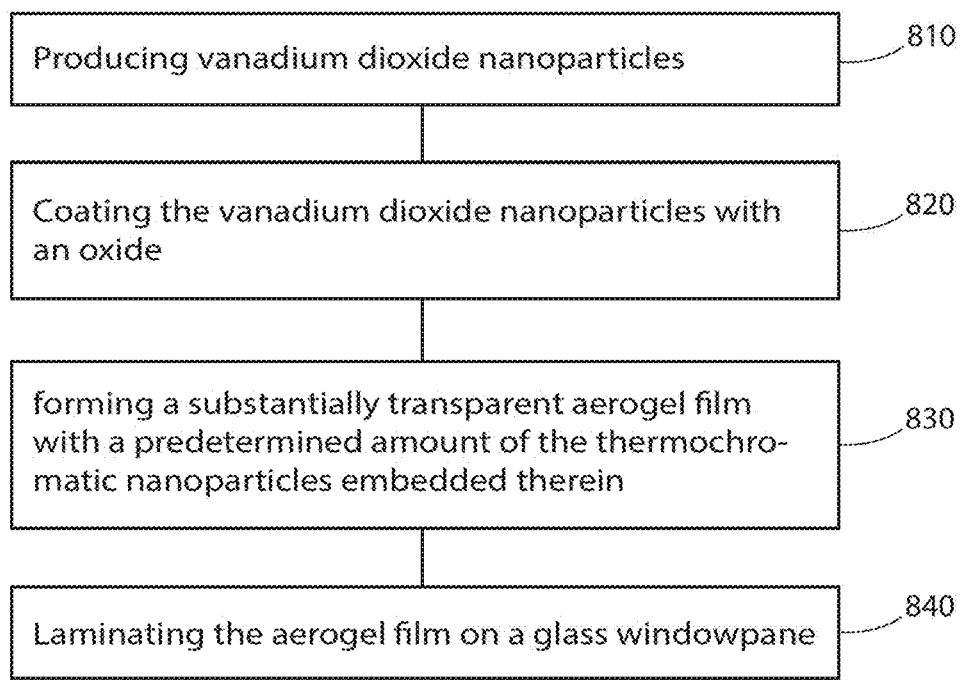
FIG. 8 is flowchart illustrating a process of retrofitting a windowpane with the VAH film according to an embodiment of the present disclosure.

FIG. 8 is flowchart illustrating a process of retrofitting a windowpane with the VAH film according to an embodiment of the present disclosure. The process begins with step 810 in which thermochromatic nanoparticles are produced. In embodiments, the individual thermochromatic nanoparticle has a vanadium dioxide core, which is then coated with a silicon dioxide shell in step 820. In step 830, a substantially transparent aerogel film is formed with a predetermined amount of the thermochromatic nanoparticles embedded therein. The embedded vanadium dioxide core transitions between an insulator phase and a metal phase at a predetermined phase-transition temperature which can be tailored by doping magnesium or tungsten therein. In embodiments, a volume fraction of the thermochromatic nanoparticles in the aerogel film is approximately between 0.001% and 0.05%. In step 840, the aerogel film is then laminated on the glass windowpane.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A retrofitted window comprising:
a glass windowpane; and
an aerogel film embedded with randomly dispersed thermochromatic nanoparticles laminated on the glass windowpane, the chromogenic nanoparticles transitioning between an insulator phase and a metal phase at a predetermined phase-transition temperature,
wherein the individual thermochromatic nanoparticle has a vanadium dioxide ($VO_2$) core with a diameter between 5 and 50 nm to reach a solar modulation ability of 5%-20% for the retrofitted window.

2. The retrofitted window of claim 1, wherein the aerogel film has a transparent matrix structure.

3. The retrofitted window of claim 1, wherein the aerogel film is selected from the group consisting of a silica aerogel, a liquid-crystalline nanocellulose aerogel and an organic-inorganic crosslinked hybrid aerogel.

4. The retrofitted window of claim 1, wherein a thickness of the aerogel film is approximately between 3 mm and 5 mm.

5. The retrofitted window of claim 1, wherein the predetermined phase-transition temperature is a room temperature.

6. The retrofitted window of claim 1, wherein the individual vanadium dioxide ($VO_2$) core is doped with a predetermined amount of a metal element for tailoring the phase-transition temperature.

7. The retrofitted window of claim 6, wherein the metal element is selected from the group consisting of magnesium and tungsten.

8. The retrofitted window of claim 1, wherein the individual thermochromatic nanoparticle includes an oxide shell encasing the vanadium dioxide ($VO_2$) core for preventing natural oxidation thereof.

9. The retrofitted window of claim 8, wherein the oxide is selected from the group consisting of $SiO_2$, $ZnO$, $TiO_2$, and $WO_3$.

10. The retrofitted window of claim 8, wherein a thickness of the oxide shell is approximately between 10 and 50 nm.

11. The retrofitted window of claim 1, wherein a volume fraction of the thermochromatic nanoparticles in the aerogel film is between 0.001% and 0.05%.

12. A retrofitted window comprising:
a glass windowpane; and
a transparent aerogel film laminated on the glass windowpane, the aerogel film being embedded with randomly dispersed nanoparticles of vanadium dioxide ($VO_2$) core and silicon dioxide (SiO2) shell,
wherein the vanadium dioxide ($VO_2$) core transitions between an insulator phase and a metal phase at a predetermined phase-transition temperature, and a volume fraction of the nanoparticles in the aerogel film is between 0.001% and 0.05% to reach a solar modulation ability of 5%-20% for the retrofitted window.

13. The retrofitted window of claim 12, wherein the individual vanadium dioxide ($VO_2$) core is doped with a predetermined amount of magnesium or tungsten.

\* \* \* \* \*